United States Patent
Perkous et al.

(10) Patent No.: US 9,944,110 B2
(45) Date of Patent: Apr. 17, 2018

(54) QR CODE CONTAINING MACHINE READABLE DNA AND NANOPARTICLES

(71) Applicant: HOLOPTICA, LLC, Belmont, CA (US)

(72) Inventors: Jiri Perkous, Scarborough (AU); Ron Taylor, Highland Park (AU); Luv Shriram, Guatam Budha Nagaz (IN); Petr Miltner, Chomutov (CZ)

(*) Notice: Subject to any disclaimer, the term of this patent is extended or adjusted under 35 U.S.C. 154(b) by 0 days.

(21) Appl. No.: 15/032,444

(22) PCT Filed: Oct. 29, 2014

(86) PCT No.: PCT/IB2014/002782
§ 371 (c)(1),
(2) Date: Apr. 27, 2016

(87) PCT Pub. No.: WO2015/063594
PCT Pub. Date: May 7, 2015

(65) Prior Publication Data
US 2016/0250882 A1    Sep. 1, 2016

(30) Foreign Application Priority Data

Oct. 31, 2013   (CZ) .................................... 2013-836

(51) Int. Cl.
*G06K 19/06*        (2006.01)
*B42D 25/328*       (2014.01)
(Continued)

(52) U.S. Cl.
CPC ........... *B42D 25/328* (2014.10); *B42D 25/36* (2014.10); *B42D 25/369* (2014.10); *B42D 25/378* (2014.10); *G06K 19/06037* (2013.01); *G06K 19/07722* (2013.01); *G07D 7/0032* (2017.05); *B82Y 30/00* (2013.01); *H04L 63/08* (2013.01); *H04W 12/12* (2013.01)

(58) Field of Classification Search
CPC ....... G06K 19/06037; G06K 19/07722; B42D 25/328; B42D 25/36; B42D 25/369; B42D 25/378; B82Y 30/00; G07D 7/0032
USPC .................................................. 235/492, 494
See application file for complete search history.

(56) References Cited

U.S. PATENT DOCUMENTS 2,801,636 A   8/1957  Pfoh
7,034,077 B2  4/2006  Buhring
(Continued)

FOREIGN PATENT DOCUMENTS

WO         2013154346        10/2013

OTHER PUBLICATIONS

English translation of the cited reference, WO 2013/154346.*
(Continued)

*Primary Examiner* — Seung Lee
(74) *Attorney, Agent, or Firm* — Brooks Kushman P.C.

(57) ABSTRACT

A security code is provided having a diffractive holographic code of a quick response type, a data-matrix two-dimensional code or other bar code types, formed by a metalized foil with the code embossed thereon. The diffractive holographic code is covered by layers of synthetic DNA and nanoparticles of highly variable properties. The imprinted layer of synthetic DNA and the imprinted layer of synthetic nanoparticles, are covered by a top layer formed of a protective transparent foil.

4 Claims, 2 Drawing Sheets

(51) Int. Cl.
*B42D 25/36* (2014.01)
*B42D 25/378* (2014.01)
*B42D 25/369* (2014.01)
*G06K 19/077* (2006.01)
*G07D 7/00* (2016.01)
*B82Y 30/00* (2011.01)
*H04L 29/06* (2006.01)
*H04W 12/12* (2009.01)

(56) References Cited

U.S. PATENT DOCUMENTS

| | | |
|---|---|---|
| 2003/0098357 A1 | 5/2003 | Cummings et al. |
| 2006/0275196 A1 | 12/2006 | Alexandridis et al. |
| 2008/0197203 A1* | 8/2008 | Wirnitzer ......... G06K 19/06037 235/494 |
| 2011/0045180 A1* | 2/2011 | Hsing .................... B82Y 30/00 427/216 |
| 2013/0004055 A1 | 1/2013 | Mori |
| 2013/0167208 A1 | 6/2013 | Shi |
| 2013/0230887 A1 | 9/2013 | Ong et al. |

OTHER PUBLICATIONS

Non-Patented Literature—International Search Report for PCT/182014/002782, Completed by the U.S. Patent and Trademark Office dated Apr. 10, 2015, 3 Pages.

\* cited by examiner

QR CODE CONTAINING MACHINE READABLE DNA AND NANOPARTICLES

CROSS-REFERENCE TO RELATED APPLICATIONS

This application is the U.S. national phase of PCT Application No. PCT/IB2014/002782 filed on Oct. 29, 2014, which claims priority to CZ Patent Application No. PV 2013-836 filed on Oct. 31, 2013, the disclosures of which are incorporated in their entirety by reference herein.

TECHNICAL FIELD

This invention involves a security diffractive holographic element of quick response code, data-matrix two-dimensional code and any other bar code provided with a conglomerate of DNA and nanoparticles of highly variable properties, which are difficult to copy by standard methods and which are destined for identification, archiving, logistics and registration of assets, and also for purposes requiring protection of documents, printed matter, packaging as well as for the protection of any other objects and products against their misuse by theft or counterfeiting. These elements or codes are also intended for precise later identification of the origin of the above-mentioned and thus protected objects in real time; such elements are called codes of quick response, sometimes also referred to as QR codes, data-matrix two-dimensional codes and any other bar codes.

So far there have been a great many different designs of standard bar codes and quick response codes which are applicable by print on printed matter, product packaging, credit cards, labels and a whole range of other objects and applications for their identification, archiving, logistics, registration and the like.

The current state-of-the-art technology helps in ensuring scanning, for instance, of bar codes and quick response codes by means of a standard reader or smart phones and tablets, and their long-distance transmission through Internet networks, as described, for example, in the US published application US 2013/0167208.

The disadvantages of the current designs of bar codes and quick response codes lie primarily in the fact that, in most cases, these are only applicable by printing and are often easily alterable both by writing instruments and by standard scanning and copying facilities. Other disadvantages consist in the fact that they contain solely alphanumerical information without the possibility of implementing other data, that they display a low definition, notably only to the maximum values and the possibilities of printing definition. Furthermore, these designs are known to be difficult to read or prove to be unreadable after soiling, can be copied on routine copiers or scans, can also be sent by fax etc., and their content lacks protection against the copying of its own code as a protective element in its own right. In some cases, quick response codes are encrypted.

New possibilities in protecting documents and other objects have emerged thanks to the application of technology, as portrayed in the American published application US2006/0275196 describing synthetic nanoparticles and in the American published application US 2013/0230887 describing polymerization of synthetic DNA acid, which can be used for the composition of layers in the technology of protective elements and their application. As for synthetic nanoparticles, the following properties may be singled out: these include ionic signature, whereby electrons from one atom are transferred to another atom, thus imparting specific properties onto that other atom. Other possibilities may be found in measurable magnetic propelties, diamagnetic qualities, paramagnetic properties and ferromagnetic properties, which, put together, add up to variable magnetization. Furthermore, nanoparticles can be characterized by adjustable frequency of light radiation, which means that nanoparticles can be programmed in such a way that they will start flashing under an active special light, including the possibility of setting the frequency of such flashing. Moreover, the color shades of radiation may also be adjusted. Nanoparticles can also be programmed in such a way that during their activation by a special light the intensity of their light is slowly waning until it's complete "switch-off". Nanoparticles may also assume different shapes, and there is a possibility of mixing various nanoparticles that display different properties.

The purpose of this invention is, therefore, to ensure safe protection of not only documents and objects themselves but also, and primarily, the code itself as a protective element in its own right, when a reader facilitates quick response and reaction, and thanks to these new technologies the existing shortcomings in this field are eliminated to the greatest possible extent.

According to this invention, the substance of the security diffractive code of quick response provided with a conglomerate of DNA and nanoparticles of highly variable properties consists in that it is formed by a layer of metalized foil with an embossed quick response code, data-matrix two-dimensional code and any other bar code which is further covered by an imprinted layer of synthetic DNA and another imprinted layer of synthetic nanoparticles.

The imprinted layer of synthetic DNA and the imprinted layer of synthetic nanoparticles are alternately covered by a top layer consisting of a protective transparent foil.

A reader, which is connected, via the Internet network, to a databank containing the registered information codes and variable properties coming from the imprinted layer of synthetic nanoparticles and from the imprinted layer of synthetic DNA is turned towards the imprinted layer of synthetic DNA and the imprinted layer of synthetic nanoparticles.

The advantages of this particular design of the security diffractive holographic codes of quick response according to this invention consist primarily in the manner of generation of these codes and in the difficult imitability of the layer of highly variable nanoparticles and the layer of highly variable synthetic DNA Difficult imitability or difficult production of copies of these protective elements is safeguarded by own production process of this quick response code by embossing it into a metalized foil and by its further implementation into an endless quantity of combinations of variable DNA, variable nanoparticles with highly variable properties by means of a conglomerate of these individual elements.

Utilization of this invention is aimed as an application of identification and protective elements for holograms, labels, products, objects, documents, packaging, for passports, identity cards, driver's licenses etc., for credit cards and banknotes, and in the field of any requirements calling for protection against misuse and falsification, while facilitating authentication in real time, complete with the tasks of tracking consignments and logistics.

According to this invention, the security diffractive code of quick response code, data-matrix two-dimensional code and any other bar code can be generated by means of the holographic method, while using the already known electron lithograph technology, namely within a definition range of up to 125,000 dpi, which—utilizing the well known procedure—is then embossed into the metalized foil under pressure and high temperature. A special pressing device is used to imprint a conglomerate of elements of synthetic DNA and synthetic nanoparticles into the surface of the metalized foil in a spot where the security diffractive code of quick response is located and, furthermore, the surface of the metalized foil with the security diffractive code of quick response code, data-matrix two-dimensional code and any other bard code and a conglomerate of DNA and nanoparticles may be laminated with a layer consisting of a protective transparent foil. Such a security diffractive code of quick response according to this invention represents a security feature which proves to be very difficult to copy by means of contemporary technologies and is intended as an application of identification and protective elements for holograms, labels, products, objects, documents and packaging, for passports, identity cards, driver's licenses etc., for banknotes and in any other fields requiring protection against misuse and falsification as well as authentication in real time.

BRIEF DESCRIPTION OF THE DRAWINGS

The attached pictures designed for greater clarification of the invention depict in FIG. 1 an exemplary design of the security diffractive code of quick response code, data-matrix two-dimensional code and any other bard codes according to this invention on a metalized foil, while

FIG. 2 depicts—in a longitudinal section—the composition of the individual layers; quite evident as the basic component in this picture is the metalized foil 1 with the embossed security diffractive code 2 of quick response on which the imprinted layer 3 of synthetic DNA and the imprinted layer 4 of synthetic nanoparticles are placed.

FIG. 3 shows the complete setup of the individual layers of the security diffractive code 2 of quick response, QR code, where-in a longitudinal section-in which there is quite evident the basic metalized foil 1 with the embossed security diffractive code 2 of quick response, QR code, on which the imprinted layer 3 of synthetic DNA and further the imprinted layer 4 of nanoparticles and, as the last layer, the top layer 5 of the protective transparent foil are placed.

FIG. 4 shows the reader 6 with the indicated flow of light 7 directed from the reader 6 and the flow of light 7.1 reflected from the imprinted layer 4 of synthetic nanoparticles with the embossed security diffractive code 2 of quick response code, data-matrix two-dimensional code and any other bar code and the imprinted layer 3 of synthetic DNA, complete with the top layer 5 of the protective transparent foil, where the reader 6 is connected, via the Internet network 8 with the databank 9 containing the registered codes and properties of nanoparticles.

DETAILED DESCRIPTION

Figure 1:
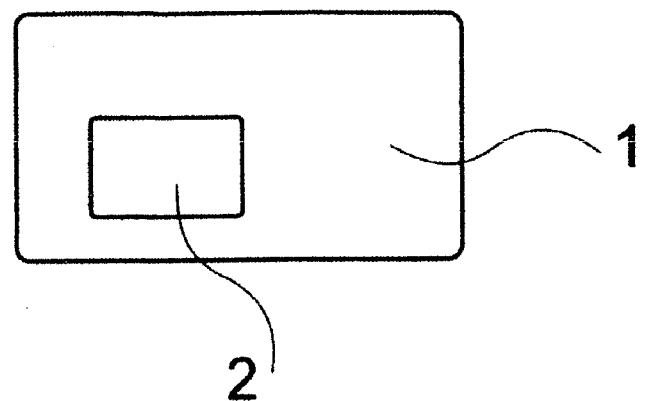
FIG. 1 represents a ground plan of the metalized foil 1 and the embossed security diffractive code 2 of quick response.
Figure 2:
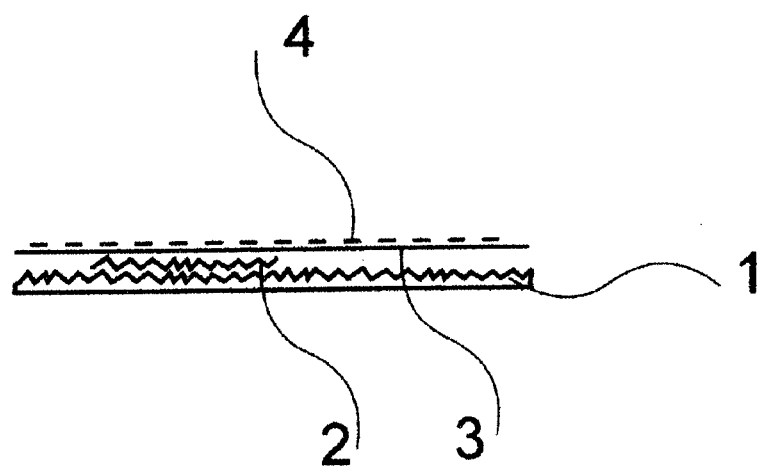
FIG. 2 shows the composition of its basic layers.
Figure 3:
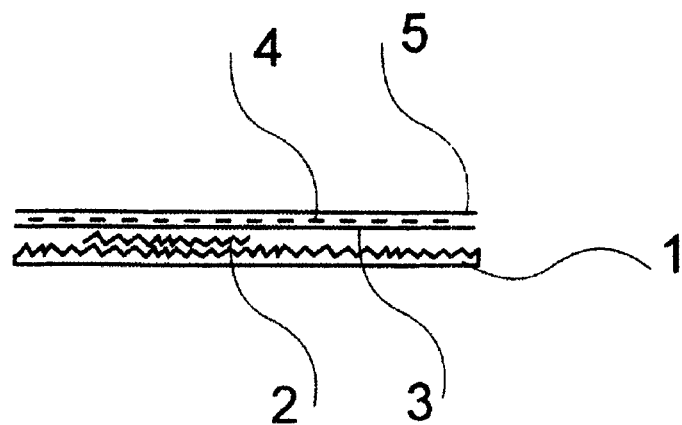
FIG. 3 depicts the complete setup of the individual layers including the protective transparent foil.
Figure 4:
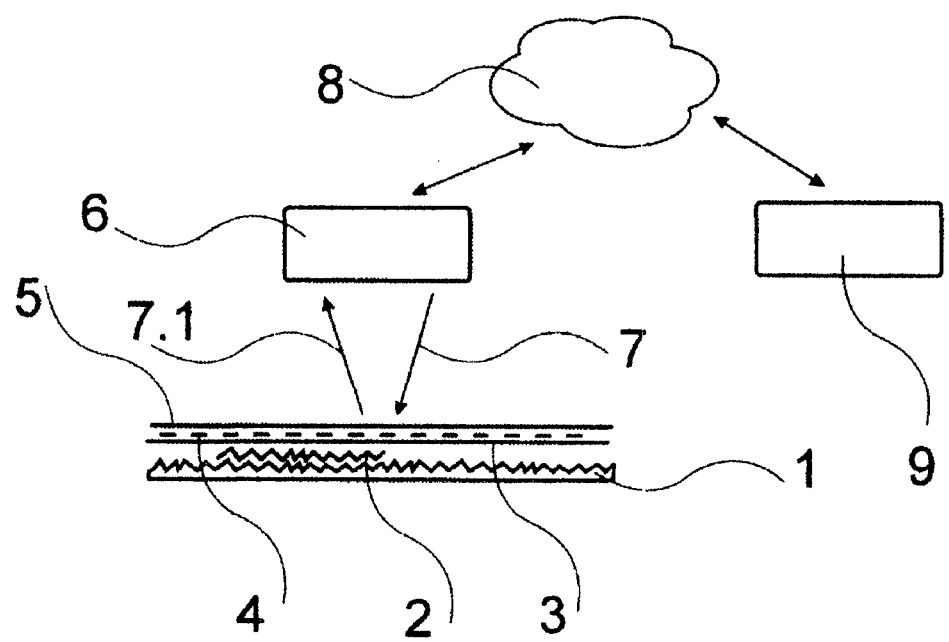
FIG. 4 shows the reader and its location during activation.

Detection and authentication of the security diffractive code 2 of quick response code, data-matrix two-dimensional code and any other bar code and its properties can be implemented by the reader 6 which is alternately formed by the following:

Standard bar code reader using standard software.

A smart phone whose reading software is usually built into the phone or can be downloaded from the Internet network—which holds true for all the known operating systems.

A tablet whose reading software is mostly built in or can be downloaded from the Internet network-which holds true for all the known operating systems.

A proprietary reader of specific production equipped with an imaging unit detecting and projecting on the imaging unit the properties of the imprinted nanoparticles, while converting them into alphanumeric information in which these properties are stored:

when illuminated by UV light situated on the reader, nanoparticles will light up, doing so in the programmed color when illuminated by a different light situated on the reader, nanoparticles will light up, later slowly losing their intensity until they are completely "switched off"

spectrophotometric properties magnetoresistant properties

The following instruments are used for forensic identification and verification of variable properties of nanoparticles and DNA:

microscope of the type—Fluorescence Lifetime Microscopy, operating 01,1 the principle of fluorescence microscopy instrument of the type—Coulter Counter Multisizer, operating on Counter's principle of measuring instrument of the type—Raman's spectroscope, DNA laboratory In case of need, a DNA sample is taken for identification and verification manually by scratching the imprinted DNA off the surface into which it was imprinted.

The invention claimed is:

1. A security code comprising:
   an embossed diffractive holographic bar code; and
   an imprinted layer of synthetic DNA and synthetic nanoparticles covering the holographic bar code; and
   top layer consisting of a protective transparent foil covering the layer of synthetic DNA and synthetic nanoparticles.

2. The security code of claim 1 wherein the bar code comprises a quick response (QR) code.

3. The security code of claim 1 wherein the synthetic nanoparticles have magneto-resistive properties.

4. The security code of claim 1 wherein the synthetic nanoparticles are sensitive to a light source in a specific UV range.

* * * * *